(12) United States Patent
Verreydt et al.

(10) Patent No.: US 12,098,941 B2
(45) Date of Patent: Sep. 24, 2024

(54) METHOD AND DEVICE FOR MONITORING A FLUID FLUX

(71) Applicant: IFLUX NV, Niel (BE)

(72) Inventors: Goedele Verreydt, Rijmenam (BE); Filip Meesters, Antwerp (BE); Joris Cools, Kapelle-op-den-Bos (BE)

(73) Assignee: IFLUX NV, Niel (BE)

( * ) Notice: Subject to any disclaimer, the term of this patent is extended or adjusted under 35 U.S.C. 154(b) by 246 days.

(21) Appl. No.: 17/773,019

(22) PCT Filed: Nov. 3, 2020

(86) PCT No.: PCT/EP2020/080809
§ 371 (c)(1),
(2) Date: Apr. 28, 2022

(87) PCT Pub. No.: WO2021/089540
PCT Pub. Date: May 14, 2021

(65) Prior Publication Data
US 2022/0412788 A1    Dec. 29, 2022

(30) Foreign Application Priority Data

Nov. 4, 2019   (BE) .................................. 2019/5757

(51) Int. Cl.
*G01F 15/18*   (2006.01)
*G01F 15/14*   (2006.01)
*G01F 1/684*   (2006.01)

(52) U.S. Cl.
CPC .............. *G01F 15/18* (2013.01); *G01F 15/14* (2013.01); *G01F 1/6842* (2013.01)

(58) Field of Classification Search
CPC ........ G01F 15/18; G01F 15/14; G01F 1/6842; G01F 1/68; G01F 1/704
See application file for complete search history.

(56) References Cited

U.S. PATENT DOCUMENTS

| | | | |
|---|---|---|---|
| 6,474,176 B1 * | 11/2002 | Gee ........................... | G01F 1/44 73/152.33 |
| 9,404,783 B2 | 8/2016 | Klammler et al. | |
| 2005/0235757 A1 | 10/2005 | De Jonge et al. | |

(Continued)

FOREIGN PATENT DOCUMENTS

WO        2016207769 A1    12/2016

OTHER PUBLICATIONS

WIPO, ISR for PCT/EP2020/080809, Jan. 20, 2021.

*Primary Examiner* — Francis C Gray
(74) *Attorney, Agent, or Firm* — HODGSON RUSS LLP

(57) ABSTRACT

The invention provides a device for monitoring a fluid flux, said device comprising a body suitable for being introduced in a medium carrying a fluid flow, which body provides one or more passages for the fluid, each having an inlet, an outlet, and a reduced channel portion in fluid communication with said inlet and outlet via respective inlet and outlet funnels, said device further comprising means for determining a flow rate of fluid traveling within one or more of said reduced channel portions. In particular, at least one of said reduced channel portions is misaligned with respect said inlets and outlets. In a further aspect, the invention provides a method for monitoring a fluid flux.

12 Claims, 11 Drawing Sheets

(56) References Cited

U.S. PATENT DOCUMENTS

| | | | |
|---|---|---|---|
| 2012/0125094 A1* | 5/2012 | Wielath | G01F 5/00 |
| | | | 73/273 |
| 2019/0093475 A1* | 3/2019 | Nyhavn | E21B 47/06 |
| 2020/0225070 A1* | 7/2020 | Halimi | G01F 7/005 |
| 2021/0231479 A1* | 7/2021 | Fourie | G01F 1/662 |

* cited by examiner

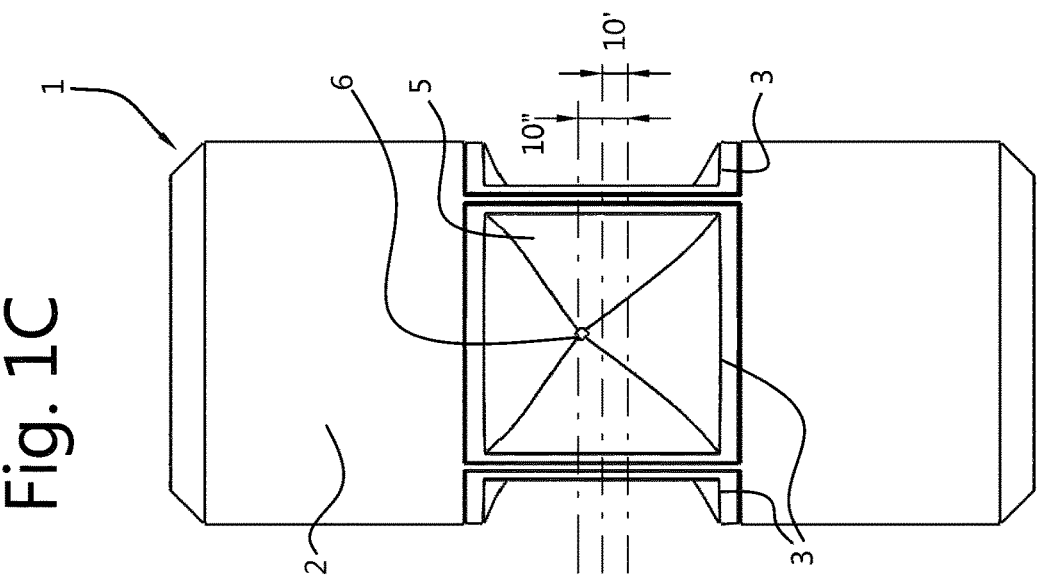
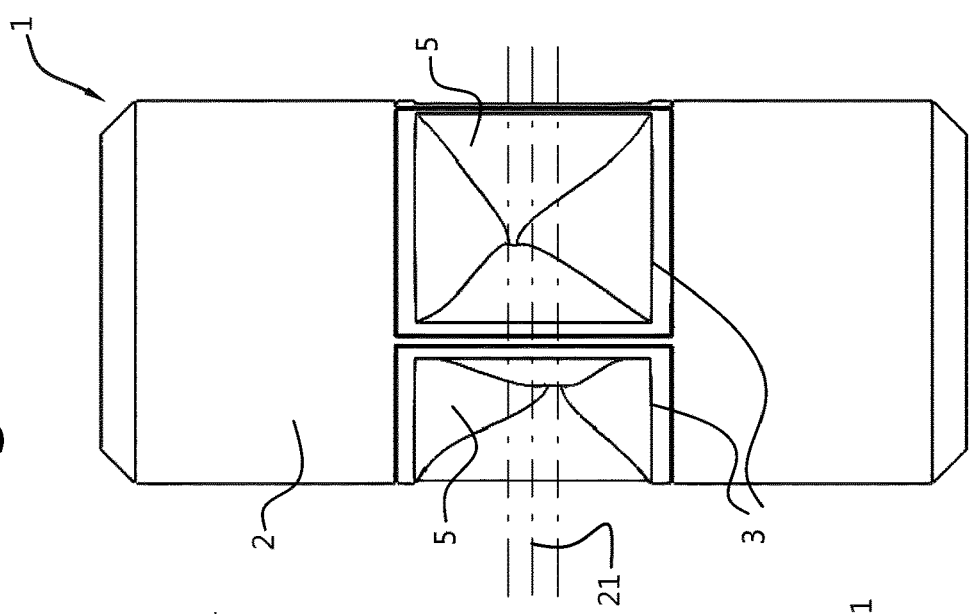
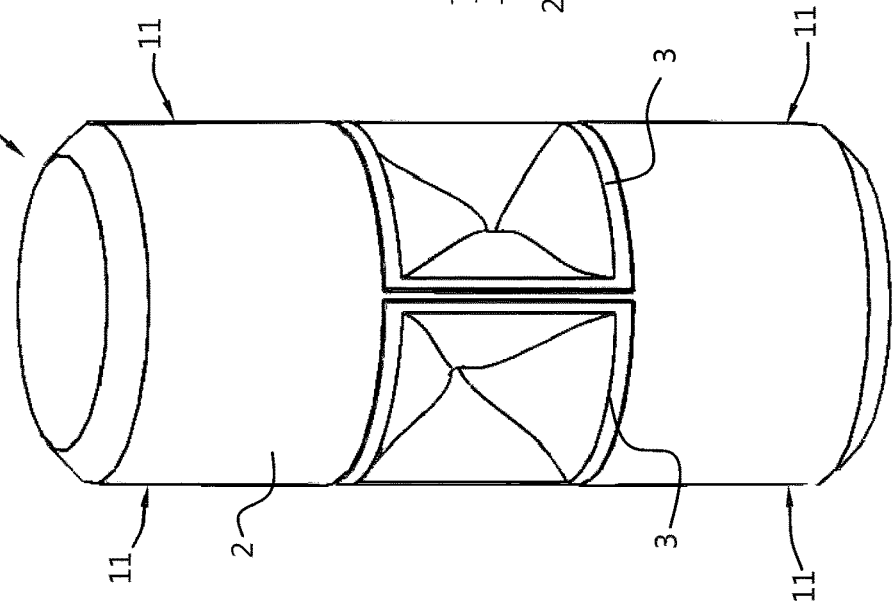

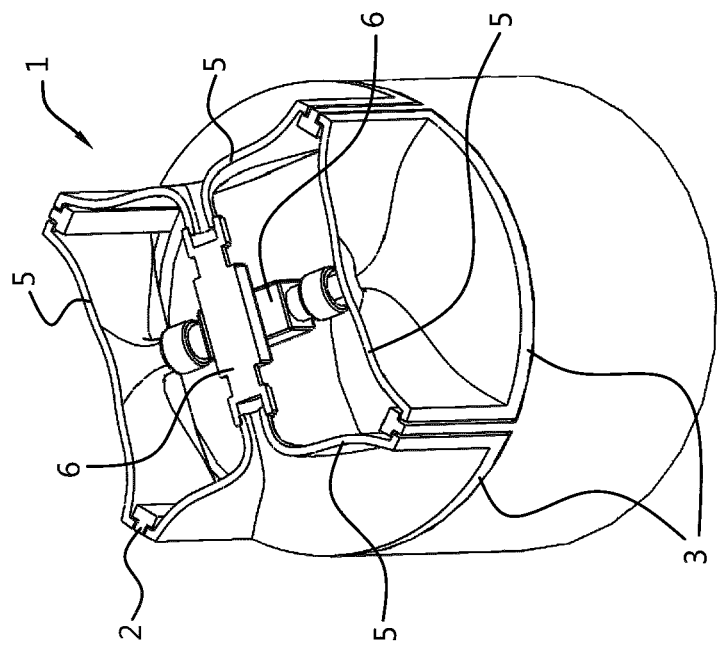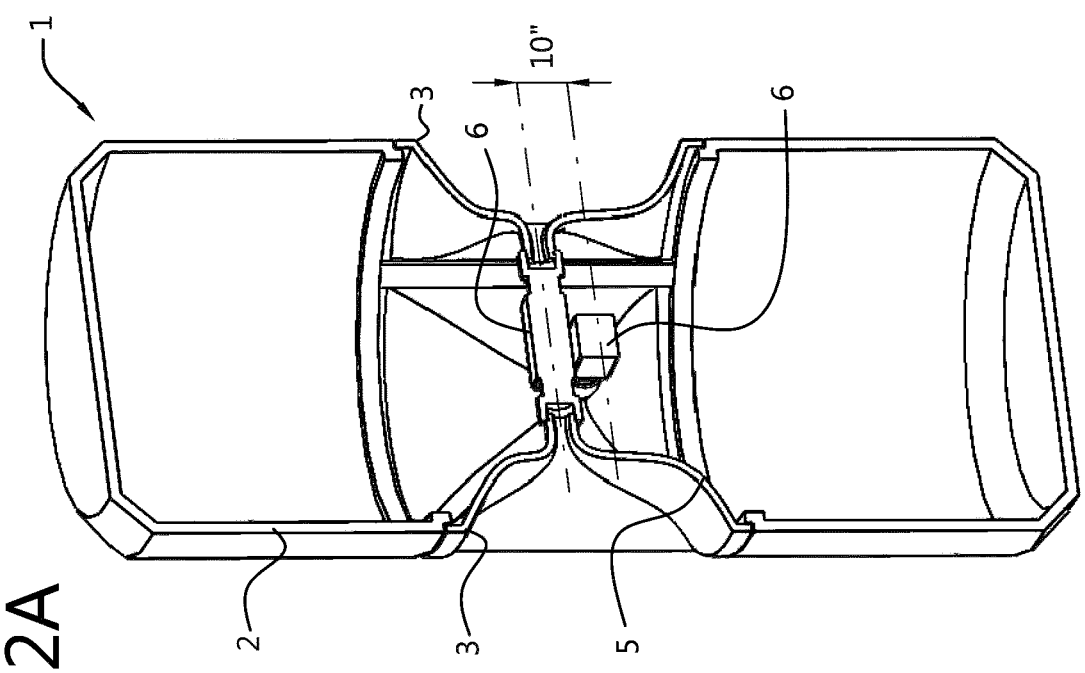

Fig. 6A
Fig. 6B
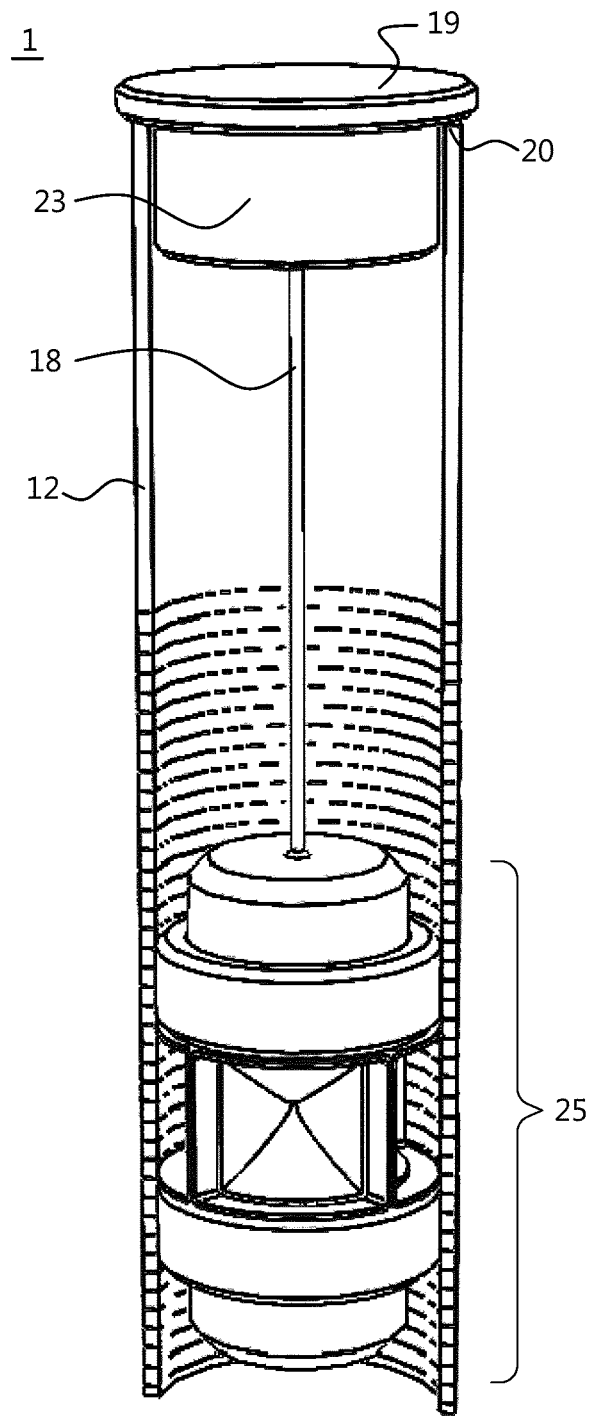
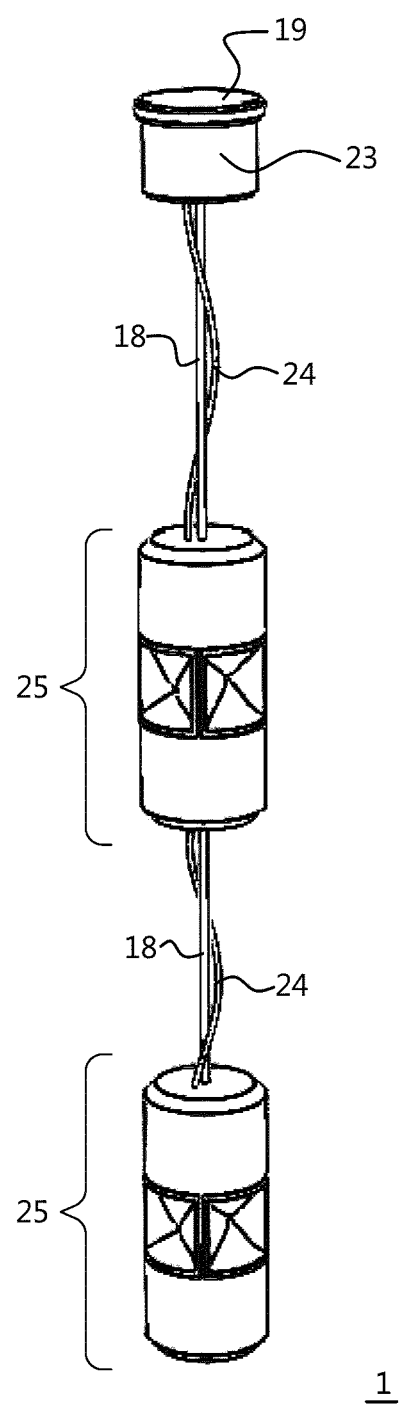

METHOD AND DEVICE FOR MONITORING A FLUID FLUX

FIELD OF THE INVENTION

The current invention generally relates to methods and devices for monitoring fluid fluxes, at least in terms of flow speed and/or flow direction. The invention is particularly well-suited for monitoring groundwater flow.

BACKGROUND

Several technologies are available for monitoring groundwater flow. WO 2016 207 769, for instance, discloses a modular device featuring two measurement cartridges in superposition, vertically adjacent to one another. Each cartridge is filled with a porous matrix of a respective material composition. A first cartridge is used for determining the groundwater mass transport, via a tracer composition bound to an absorbent. The second cartridge is used for determining the mass transport of a substance dissolved in the groundwater, via an absorbent composition. A device of such design allows for locally monitoring a horizontal groundwater flux. The groundwater on the one hand, and the substance(s) dissolved therein on the other hand are monitored in parallel. There is no risk of cross-contamination.

The cartridges may further be adapted for measuring both the magnitude and direction of mass transport. To such end, each cartridge is provided with three permeable partitions. Thus dividing the flow chamber into three flow compartments. The groundwater flux is determined via vector superposition of the individual compartment fluxes.

An important drawback of the device, however, is that it only provides time-averaged measurements. This may result in a distorted picture, not providing a comprehensive view of instantaneous mass transport, nor of its evolution in time. Typically, devices as disclosed in WO 2016 207 769 reside underground for a predetermined measurement period, e.g. a few hours up to several months. Only subsequently the device is collected, and time-averaged mass transport data can be derived from concentration values/profiles. No direct measurement technique is provided.

U.S. Pat. No. 9,404,783 further discloses a sediment bed passive flux meter. The flowmeter has a sorptive matrix impregnated with one or more tracers, for intercepting a groundwater flow passing between its intake portion and its exhaust portion. The monitoring of vertical groundwater and contaminant mass fluxes is especially envisaged. Again, however, the device only provides time-averaged measurements.

Another fluid flow measuring device is provided in U.S. Pat. No. 6,474,176. Latter device is especially devised for determining vertical fluid flow rates occurring in unsaturated soils, under influence of gravity. To such end, the device is introduced directly into the soil, and the measuring technique indeed requires the device to be in direct contact with the soil. The device has an opposing upper funnel and lower funnel, with a narrow channel portion therebetween. Groundwater collected by the upper funnel subsequently travels downwards, through the reduced channel portion. The amplified flux within said channel portion is determined via thermoanemometry.

A drawback is that U.S. Pat. No. 6,474,176 is solely focused on monitoring one-dimensional, vertical groundwater flow. It cannot be readily applied to other types of fluid flow. A further drawback of the funnel design is that it leads to a voluminous device. Space in between the funnels is inefficiently exploited. In particular, the narrow channel portion present in the center of the device may pose further restrictions on the size, shape, and position of the thermoanemometry measurement system.

US 2019/093475 discloses a method and system of monitoring fluid flow in a wellbore.

U.S. Pat. No. 6,474,176 describes a fluid flow device for determining fluid flow rates in soils. The fluid flow device includes a conduit for receiving a fluid.

Generally, important features of devices for monitoring fluid flow may relate to:
 their precision and accuracy, even at limited flow rates,
 their robustness,
 their durability, especially in contaminated and/or acid environments,
 their compactness, and/or
 their (low) energy consumption.

The current invention aims to provide an improved method and device for monitoring fluid flow, thereby resolving one or more of the above-mentioned problems.

SUMMARY OF THE INVENTION

To such end, a device according to claim 1 is provided for monitoring fluid fluxes. The device has a body that provides one or more passages for the fluid, each having an inlet and an outlet. Fluid can flow between said inlet and said outlet via a consecutive inlet funnel, a reduced channel portion, and an outlet funnel. Further means are provided for determining a flux level within the reduced channel portions. The reduced channel portions generally have a smaller cross-sectional area, such that flow velocity is amplified. For instance, flux levels may be determined at a higher precision. The means for determining flux level (i.e. the fluid flux sensing means) may or may not involve a direct measurement technique. And in particular, at least one of the reduced channel portions is misaligned with respect to the inlets and outlets of the device.

A device of such design may have several advantages. Indeed, misalignment, i.e. not imposing that the passage has a strict rectilinear extension between (the centers of) its corresponding inlet and outlet openings, orthogonal to said openings, and central with respect to the general arrangement of inlet and outlet openings, offers a greater degree of freedom in relation aspects of the design. For instance, (i) a more compact device may be designed, (ii) a more convenient device shape may be considered, (iii) an optimal choice concerning the position and/or orientation of the inlets and outlets may be made, (iv) multiple reduced channel portions may now be able to pass each other within the device, and/or (v) more space may be provided within the device, e.g. for the measurement instruments. The invention is generally not limited to any of these advantages and effects. More specific embodiments are further discussed below.

Preferably, the current device is at least suitable for being used in saturated flow conditions. The inventors found that, in such flow conditions the exact position and/or orientation of the reduced channel portion with respect to the openings is of little importance. That is, misalignment only has a limited effect on the measurements. This is contrary to the teachings of U.S. Pat. No. 6,474,176, which entirely focusses on monitoring unsaturated, one-dimensional, vertical groundwater flow. Such unsaturated vertical flow indeed requires the inlet opening and inlet funnel to be oriented vertically upward, with the reduced channel portion, the outlet funnel and the outlet opening also extending vertically in alignment with the inlet opening. As such, possible air bubbles (which may occur in unsaturated flow conditions and which may greatly affect the measurement results) could escape in an upward direction.

The current device design, preferably used in saturated flow conditions, may offer a lot more freedom concerning choice of position and orientation of the of the inlets and outlets. Latter choices advantageously define which portion of the fluid flow is collected, and therefore which aspect of the fluid flow can be studied.

In a particularly preferred embodiment according to claim 2, said reduced channel portion is misaligned with respect to said inlets and outlets, more specifically in that it is offset with respect to said inlets and outlets. A device of such design may have several advantages.

Most importantly, space within the voluminous body can be exploited more efficiently. As is shown in the non-limiting embodiment of FIG. 9A-C, more space is available for the fluid flux sensing means.

As opposed to U.S. Pat. No. 6,474,176, the present invention is especially concerned with saturated flow, driven by gravity on the one hand and by geology on the other hand. Saturated flow of a fluid through a porous medium (e.g. the earthen soil) is typically governed by Darcy's law. Devices according to the present invention do therefore not necessarily require direct contact with the soil. As such, they can be installed and removed more easily. Moreover, the invention is not generally restricted to vertical flow, but can be applied for measuring any flow direction or flow directions. For instance, the invention may be particularly useful for measuring two-dimensional, horizontal flow.

It should be noted, however, that the invention is generally applicable to both saturated and unsaturated flow, in one or more than one dimension.

In a particularly preferred embodiment of claim 5, the device has at least two passages in substantially different directions. In particular, the aforementioned offset therein allows their reduced channel portions to pass each other, at the center of the device. In contrast to U.S. Pat. No. 6,474,176, such devices enable the monitoring of more-dimensional flow.

According to a further aspect, the invention moreover provides a method according to claim 13 for monitoring fluid fluxes. Similar advantages apply.

BRIEF DESCRIPTION OF FIGURES

FIGS. 1A-C respectively show a perspective view and two side views of a device according to a possible embodiment of the invention.

FIGS. 2A-B further show longitudinal and lateral cuts of the device of FIG. 1A-C.

FIGS. 6A-B show further embodiments of the device, now provided with a cover member for covering an access opening of a monitoring tube.

DETAILED DESCRIPTION OF THE INVENTION

Figure 3A:
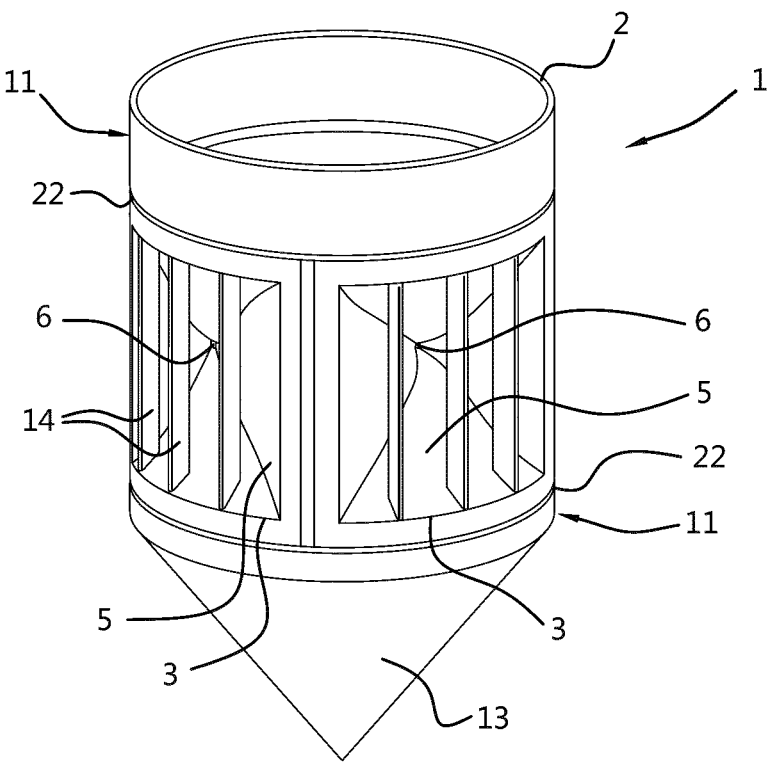
FIGS. 3A-B respectively give a perspective view and a lateral cross-section of a device according to a further embodiment of the invention.

The present invention concerns a method and a device for monitoring a fluid flux.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

In a first aspect, the invention provides a flowmeter device for monitoring a fluid flux, said device comprising a body suitable for being introduced in a medium carrying a fluid flux, which body provides one or more passages for the fluid, each having an inlet (=inlet opening), an outlet (=outlet opening), and a reduced channel portion in fluid communication with said inlet and outlet via respective inlet and outlet funnels, said device further comprising means for determining a flux (=flow speed=flow rate) of fluid traveling within one or more of said reduced channel portions. In particular, at least one of said reduced channel portions is misaligned with respect to said inlets and outlets.

The above-mentioned inlets and outlets are preferably provided by respective "opening zones" present on an envelope surface of the device, latter zones being at least partially permeable to the fluid. In general, the inlet and outlet enable fluid exchange between the reduced channel portion and the surrounding medium. In an embodiment, an inlet and a corresponding outlet may be provided by a respective simple aperture through which fluid can flow. In another embodiment, an inlet and a corresponding outlet may be provided by a perforated or slotted zone, each comprising a plurality of apertures through which fluid can flow.

Preferably, fluid can flow through the inlet/outlet at least in a direction substantially orthogonal to the corresponding opening zone (i.e. orthogonal to a simple aperture, or orthogonal to a perforated or slotted zone).

Furthermore, the terms "inlet" and "outlet" are interchangeable. Whether an opening at either end of a passage acts as an inlet or as an outlet, may further depend on the orientation of the device with respect to the fluid flow. Inlet and outlet funnels fluidly connect the respective inlet and outlet openings to the reduced channel portion therebetween. The funnel entries connect to the inlet/outlet openings. The funnel entries may for example coincide with the inlet/outlet openings. However, this is not necessarily so. In any case, the funnel entries cover a relatively large cross-sectional area, for the purpose of collecting fluid flux. The funnel exits connect to the reduced channel portion. The latter generally has a smaller cross-sectional area. Flow velocity is therefore amplified within the reduced channel portion. As such, flux can be determined at a higher precision, and/or the measuring range is expanded/shifted. Optionally, the reduced channel portion is of such dimensions that it encourages a laminar flow. The latter may be important for some measurement techniques (see below). However, the invention is generally not limited thereto. Also note that laminar flow is not only determined by flow geometry, but also by other characteristics such as flux (=flow speed).

Optionally, the device may have a degree of symmetry, such that it can be introduced into the medium according to multiple orientations, wherein the substantially the same flux is collected, and wherein substantially the same aspects of fluid flow can be monitored. For instance, in a possible, non-limiting embodiment thereof, the inlet and outlet openings have substantially the same size and shape, and their general arrangement is such that the device has at least one degree of symmetry that leads to the same general arrangement of openings, but in which two or more openings have changed places (e.g. swapped positions). Possibly, the degree of symmetry may include a 90°-rotation about its longitudinal axis, a 180°-rotation about its longitudinal axis, and/or a reflection w.r.t. a lateral plane of symmetry.

The aforementioned "reduced channel portions" preferably have a smaller cross-sectional area than the corresponding inlet and/or outlet openings of the device.

The aforementioned "flow passages" generally extend through the body of the device. Preferably, the passages themselves are non-permeable to the fluid, while providing a fluid connection between opposed funnel entries (acting as inlet and outlet openings). One or more such passages are separated from each other. They may pass through the body, between opposite sides of the body. Corresponding inlet and outlet openings may be arranged in opposition, i.e. opposed to one another.

In particular, at least one of said reduced channel portions is misaligned with respect to said inlets and outlets. That is, the device does generally not support a rectilinear fluid flow that enters the inlet opening orthogonally, that is confined by the inlet funnel, further traveling into and through the reduced channel portion, that is subsequently expanded by the outlet funnel, and that exits the device orthogonally through its outlet opening.

At least the reduced channel portion of a passage is such that it necessarily imposes to such flow (orthogonally entering and exiting the device via one of its inlet and outlet openings respectively) at least one change of direction or at least one lateral shift (=an offset), w.r.t. to the openings.

Possible advantages are that (i) a more compact device may be designed, (ii) a more convenient device shape may be considered, (iii) an optimal choice concerning the position and/or orientation of the inlets and outlets may be made, (iv) multiple reduced channel portions may now be able to pass each other within the device, and/or (v) more space may be provided within the device, e.g. for the measurement instruments. The invention is generally not limited to any of these. Most importantly, the inventors found that misalignment only has a limited effect on the measurements in saturated flow conditions. The invention may or may not be especially configured for monitoring saturated flow conditions.

In a particularly preferred embodiment, at least one of the reduced channel portions is offset with respect to the inlet and outlet openings. For instance, the above-mentioned reduced channel portion is "misaligned" in that it is "offset" w.r.t. the inlets and outlets. That is, said reduced channel portion is out of line with respect to one or more of the inlets/outlets, and preferably with respect to an ensemble of inlets and outlets. For instance not central to, or not in line with the whole of all such passage inlets and outlets. The amount or distance by which said reduced channel portion is out of line is further referred to as "the offset".

A channel being offset with respect to one or more openings, may not be central with respect to a general arrangement of these openings. Additionally or alternatively, a channel being offset may not be (entirely) contained within an imaginary median plane passing through the center of these openings, or at least being central with respect to the general arrangement of these openings. Preferably, the reduced channel's position comprises a linear offset in a direction that is orthogonal to its main direction of extension, between the inlets and outlets, and optionally between its corresponding inlet and outlet.

As discussed below, there are several embodiments in which reduced channel portions may be "offset" with respect to one or more of the openings, and/or with respect to each other. Optionally such an offset may be "comprised within" a reduced channel portion, e.g. embodied by a deviation or curvature along the extension of the latter. The invention is generally intended to cover all such embodiments.

In a further or alternative embodiment said reduced channel portion is offset with respect to its corresponding inlet and outlet. For instance, the reduced channel portion may comprise a deviation, for example a curvature between the corresponding funnel exits, thereby providing an offset at the position of the deviation (e.g. shown in FIG. 10B). In a further or alternative embodiment said funnels each have a funnel entry, wherein at least one funnel has a funnel exit that is offset with respect to said funnel entry. For instance, the funnels themselves may be distorted/skewed so as to provide an offset (e.g. shown in FIG. 1-9). In a further or alternative embodiment, more than one passage is provided, wherein the passages as a whole are offset with respect to one another. That is, the respective inlet openings, outlet openings, inlet funnels, outlet funnels and reduced channel portions are offset with respect to one another (e.g. shown in FIG. 10A). In particular, in the embodiment of FIG. 10A, the reduced channel portions are each offset with respect to an ensemble of all four inlet/outlet openings; none of both is (entirely) contained within an imaginary, horizontal median plane that is central to the general arrangement of all four inlet/outlet openings. However, the invention is generally not limited to the embodiments given in the figures.

The "funnel entries" may or may not correspond to the aforementioned inlets (=inlet openings) and outlets (=outlet openings). The inlet and outlet openings may be understood as the outer circumferential edge portions of the corresponding opening structures.

In general, due an offset, more space is available within the body of the device. Indeed, in case the device provides two or more passages, their reduced channel portions may now be able to pass each other at the center of the device (e.g. shown in FIGS. 1-8 and FIGS. 10A-B). Also in case of such multiple passage designs, space in between inlet and outlet funnels of one passage may be now occupied by the inlet and outlet funnels of further passages. A more compact design is thereby envisaged, in which space is more efficiently exploited. Additionally or alternatively, it may be so that the reduced channel portion no longer passes through the center of the body/along a central axis of the body. More space is thus available for the measurement system, i.e. for flux sensing means, at one side with respect to the narrow channel portion (e.g. shown in FIG. 9).

The flowmeter is generally provided with a flux sensing means in sensing relation to one or more of the reduced channel portions, for determining a flux of fluid traveling therein. The reduced channel portions may provide a narrower cross-sectional area, and therefore an amplified flux (i.e. of higher flow velocity). The amplified flux is registered. One or more characteristics of the surrounding fluid flow are readily derived.

Optionally, the flux sensing means provide at least a time-dependent signal (e.g. a voltage signal or a current signal) that can be stored onto a storage medium (e.g. an electronic storage medium). The latter allows for time-resolved measurements. Optionally, said signal or any further processed signal may be consulted at any time during the measurement. To such end, wireless and/or wired communication means may be provided. Optionally, the signal or any further processed signal is displayed onto a display means that is consultable by a user, during measurement. Preferably, the flux sensing means at least provides a time-resolved measurement technique, such that an evolution in time of the fluid flow can be observed.

Preferably, the flux sensing means has a relatively low energy consumption. As such, the device can operate independently for a longer measurement period, e.g. up to several months.

In a non-limiting embodiment the flux sensing means may comprise a calorimetric sensing means. For instance, the flux sensing means comprises a heating element between a pair of temperature sensors, within the reduced channel portion. Further depending on the fluid flow direction, one temperature sensor is positioned upstream relative to the heating element, and the other temperature sensor is positioned downstream. The heating element may be configured to produce heat pulses. A resulting temperature gradient is detected. The latter allows for determining a flow speed and a flow direction, within the reduced channel portion.

In an alternative, non-limiting embodiment the flux sensing means may comprise a volumetric sensing means. For instance, one or more heating elements are controlled in such a way that a constant temperature profile is established with respect to a set of at least two temperature sensors, within the reduced channel portion. An applied voltage or current needed to maintain this temperature profile may serve as a sensor signal.

In yet an alternative, non-limiting embodiment the flux sensing means may comprise an injected tracer sensing means. For instance, a detectable tracer is injected within the reduced channel portion. Detectors are placed at opposite ends of the channel portion. A tracer concentration gradient is detected, allowing for the determination of a flow speed and a flow direction. The tracer may for instance be an electrolyte, while the detector is an electrical conductivity sensor.

Optionally, the reduced channel portion may encourage laminar flow. The accuracy of one or more of the above techniques is thereby increased. It is noted that further suitable measurement techniques exist (e.g. colloidal bore scope, . . . ). The invention is generally not limited to any of the above.

The device according to the invention may be particularly well-suited for monitoring groundwater flow. Soil flow rates may be relatively slow, such that accurate measurements are difficult. The present device provides a flux amplification, thereby resolving latter problem. Groundwater flow may be monitored by lowering the device within a monitoring tube of a groundwater monitoring well. Latter tube may or may not be vertical. Alternatively, groundwater flow may be monitored by introducing the device directly into the soil (e.g. with the aid of a downward pin present on the device). However, the invention is generally not limited to groundwater flow. It may be applied to groundwater flux, surface water flux, and any other type of flux.

Optionally, the device may be supplemented with further sensing means. In a possible example, the device may be supplemented with one or more cartridges having a porous absorbent matrix, and either further comprising a tracer (e.g. for measuring a fluid mass transport) or not (e.g. for measuring a mass transport of dissolved substances). The aforementioned device body and one or more of such cartridges (=passive flux meters) may be placed in superposition. In a further or alternative example, the device may be supplemented with additional (time-resolved) sensing means, for sensing any further chemical of physiochemical parameter(s).

According to a further or alternative embodiment the device comprises at least two passages of which the reduced channel portions extend in substantially different directions. The reduced channel portions may or may not be skew. They are preferably non-intersecting. The reduced channel portions may or may not be orthogonal to one another. Preferably at least two fluxes are monitored. Corresponding flow vector components may be derived. The latter advantageously allows for monitoring more-dimensional (e.g. two-dimensional or three-dimensional) flow, in terms of flow speed and flow direction.

In a further or alternative embodiment, the device has first and second passages that are offset with respect to one another. In a further or alternative embodiment, the device has first and second reduced channel portions that are offset with respect to one another. Preferably, an offset may allow the passages (or their reduced channel portions in particular) to pass each other, within the body of the device.

The device may be provided with a means for determining its orientation with respect to an external reference system. The above device may allow for determining a flow direction with respect to the device. Latter orientation means now further allow to find the corresponding flow direction with respect to the external reference system. Said orientation means may or may not comprise a lockable compass (i.e. locked at initialization of a measurement). Said orientation means may or may not comprise a digital compass. Said orientation means may or may not comprise an orientation marker, enabling the arrangement of the device according to a desired orientation.

According to a particularly preferred embodiment, one or more of the inlet/outlet funnels have a funnel exit that is out of line with respect to its funnel entry. An offset of a reduced channel portion, with respect to the corresponding funnel entry is thus overcome within the funnel itself. The inventors found that a slight asymmetry or distortion within a funnel has a limited impact on the measurement accuracy. Indeed, the funnel generally provides a wide cross-section. Its hydraulic conductivity is therefore high, and its impact on the fluid flux low.

Optionally, the hydraulic conductivity of the inlet funnel, the reduced channel portion, and/or of the outlet funnel may be taken into account when processing the measured data.

According to a further or alternative embodiment said body has an elongate shape, wherein said inlets and outlets are arranged laterally. Such an arrangement is particularly useful for monitoring a lateral two-dimensional flux profile with respect to the device body. At least one reduced channel portion may have a longitudinal offset with respect to the inlet and outlet openings.

According to a further or alternative embodiment said body has a substantially cylindrical shape. Preferably, the funnels have an average opening angle of more than 90° (in case of two passages and four funnels). Space is therefore available between the funnels, so as to house their reduced channel portions.

According to a further or alternative embodiment said body has an upper and lower means for slidingly engaging a tube wall of a monitoring tube. Said monitoring tube may or may not constitute a groundwater monitoring well. Said monitoring tube may or may not be arranged vertically. The tube wall may or may not be perforated or slotted, such that fluid is substantially freely exchanged between the device and the surrounding medium, through said tube wall. A hydraulic conductivity of such perforated or slotted tube wall may or may not be taken into account. Optionally, the body is provided with one or more, elastomer washers that engage the inner side of the tube wall. Further or alternative sealing means may be provided for separating the individual inlet and outlet openings.

According to a further or alternative embodiment said device is further provided with a cover member for covering an access opening of a monitoring well pipe, which cover member houses a control unit of the device. Advantageously, the control unit is then available at said access opening. The cover member may be provided with a display means for displaying sensor data or processed measurement results. Preferably, the control unit is communicatively coupled with the flux sensing means. Preferably, also a power source and storage medium is housed within the cover member.

In a further or alternative embodiment, the device has an elongate shape wherein at least one inlet and corresponding outlet are arranged laterally (or radially) at different longitudinal positions, with the reduced channel portion extending therebetween. Preferably, the reduced channel portion extends along the longitudinal direction of the device, between the inlet and outlet. In this embodiment, the reduced channel portion is misaligned with both its inlet and outlet, in that it is orthogonal to the inlet and outlet orientations (i.e. parallel to the inlet and outlet zones). Reference is made to the non-limiting embodiment of FIG. 11A-C.

In a further aspect, the invention may provide an alternative device for monitoring a fluid flow, said device comprising a body suitable for being introduced in a medium carrying a fluid flow, which body provides one or more passages for the fluid, each having an inlet, an outlet, and a reduced channel portion in fluid communication with said inlet and outlet via respective inlet and outlet funnels, said device further comprising means for determining a flux level of fluid traveling within one or more of said reduced channel portions. In particular, at least one of said reduced channel portions is offset with respect to said inlets and outlets. One or more of the above features and corresponding advantages may further apply.

In a further aspect, the invention may provide yet an alternative device for monitoring a fluid flow, said device comprising a body suitable for being introduced in a medium carrying a fluid flow, which body provides one or more passages for the fluid, each having an inlet, an outlet, and a reduced channel portion in fluid communication with said inlet and outlet via respective inlet and outlet funnels, said device further comprising means for determining a flux level of fluid traveling within one or more of said reduced channel portions. In particular, said body provides at least two such passages extending in substantially different directions. Preferably, the device has means for determining a flux level in relation to each of said passages. Advantageously, two- or more-dimensional fluid flow can be monitored. One or more of the above features and corresponding advantages may further apply.

In a further aspect, the invention may provide yet an alternative device for monitoring a fluid flow, said device comprising a body suitable for being introduced in a medium carrying a fluid flow, which body provides at least one passage for the fluid, said passage having an inlet, an outlet, and a reduced channel portion in fluid communication with said inlet and outlet via respective inlet and outlet funnels, said device further comprising means for determining a flux level of fluid traveling within said reduced channel portion. In particular, said body has an elongate and/or substantially cylindrical shape, wherein said passage is arranged laterally within said body. That is, substantially orthogonal to the elongate and/or cylinder axis. Such devices may be introduced into flow-carrying media, along latter axis. Quite advantageously, they then further enable at least one lateral characterization of fluid flow, thus orthogonal to their direction of introduction. Optionally, the elongate and/or cylinder axis may be an axis of symmetry. One or more of the above features and corresponding advantages may further apply.

In one possible, non-limiting embodiment, the device body has an elongate and/or cylindrical shape, wherein the device is configured for being introduced directly into the soil. Optionally, the device body provides a downward pin for doing so. Once introduced, the device provides a lateral characterization of flow via said at least one reduced channel portion. For instance, the device may be introduced vertically into the soil, then further providing a horizontal characterization of groundwater flow.

In another possible, non-limiting embodiment, the device body has an optionally elongate and preferably substantially cylindrical shape, wherein the device is especially adapted for being introduced within a monitoring tube. Preferably, the cylindrical body may therein slidingly (and optionally sealingly) engage the tube wall. Again, the device provides a lateral characterization of flow, orthogonal to its direction of introduction, and orthogonal to the monitoring tube direction of extension.

Optionally, the device body has a substantially cylindrical shape in which the at least two funnels are laterally arranged, and in which their funnel entries have a substantially convex shape, preferably corresponding to the cylinder body. Non-limiting embodiments are shown in FIGS. 1-8 and in FIG. 10.

In a further aspect, the invention provides a method for monitoring a fluid flow, comprising the steps of:
collecting, at an inlet, an inlet flux from a medium carrying a fluid flow,
converging said inlet flux into an amplified flux,
determining a flux level in relation to said amplified flux,
diverging said amplified flux, and
returning, at an outlet, said diverged flux to said medium as an outlet flux.

In particular, said flux comprises a curved course between being collected and returned. That is, the general flux comprises at least one curve. For instance, a flux through a distorted funnel (i.e. having a funnel entry not aligned with its funnel exit) will generally have a curve between said funnel entry and exit. Generally, the flux may have a course that is misaligned with respect to the inlet and outlet flux.

In a further or alternative embodiment, said inlet and said outlet flux have substantially the same flow velocity. Preferably, the inlet and outlet have a similar cross-section, and the flux is converged and diverged to similar and opposite extent. More preferably, the inlet and outlet have a similar shape and cross-section. More preferably, the device has a degree of symmetry such that inlet and outlet may swap places while still allowing for monitoring similar aspects of the fluid flow.

In a further aspect, the invention provides a method for monitoring a fluid flow, said method comprising the steps of:
collecting at least one inlet flux from a medium carrying a fluid flow,
converging said inlet flux into an amplified flux,
determining a flux level in relation to said amplified flux, and
returning to said medium at least one outlet flux, In particular, said amplified flux is offset with respect to the inlet flux collected, and/or with respect to the outlet flux returned. Preferably, either of the above devices is suitable for performing the method. Corresponding features and advantages are therefore repeated. Preferably, the invention is applied for monitoring saturated flow in particular.

According to a further or alternative embodiment at least two inlet fluxes are collected from substantially different directions. Advantageously two- or more-dimensional fluid flow can be monitored by sensing the corresponding amplified flux level. According to a further or alternative embodiment a fluid flow direction is determined, based on flux levels determined in relation to said at least two inlet fluxes.

According to a further or alternative embodiment said method is applied for monitoring a groundwater flow. According to a further or alternative embodiment said fluid flux is collected and returned through a perforated wall of a groundwater monitoring well. However, the invention is generally not limited to monitoring groundwater flow.

In a further aspect, the invention provides a method for monitoring a fluid flow, said method comprising the steps of:
collecting at least one inlet flux from a medium carrying a fluid flow,
converging said inlet flux into an amplified flux,
determining a flux level in relation to said amplified flux, and
returning to said medium at least one outlet flux, In particular, at least two such inlet fluxes are separately collected from substantially different directions. Advantageously, two- or more-dimensional fluid flow can be monitored. One or more of the above features and corresponding advantages may further apply.

In a further aspect, the invention provides a method for monitoring a fluid flow, said method comprising the steps of:
collecting at least one inlet flux from a medium carrying a fluid flow,
converging said inlet flux into an amplified flux,
determining a flux level in relation to said amplified flux, and
returning to said medium at least one outlet flux, In particular, said fluid flow is monitored by means of a monitoring device inserted into the medium along a direction of insertion, wherein said inlet flux collected and/or said outlet flux returned are substantially orthogonal with respect to latter direction of insertion. One or more of the above features and corresponding advantages may further apply.

The invention is now further described by means of the following non-limiting examples and figures which further illustrate the invention, and which are not intended to, nor should they be interpreted to, limit the scope of the invention.

Figure 5B:
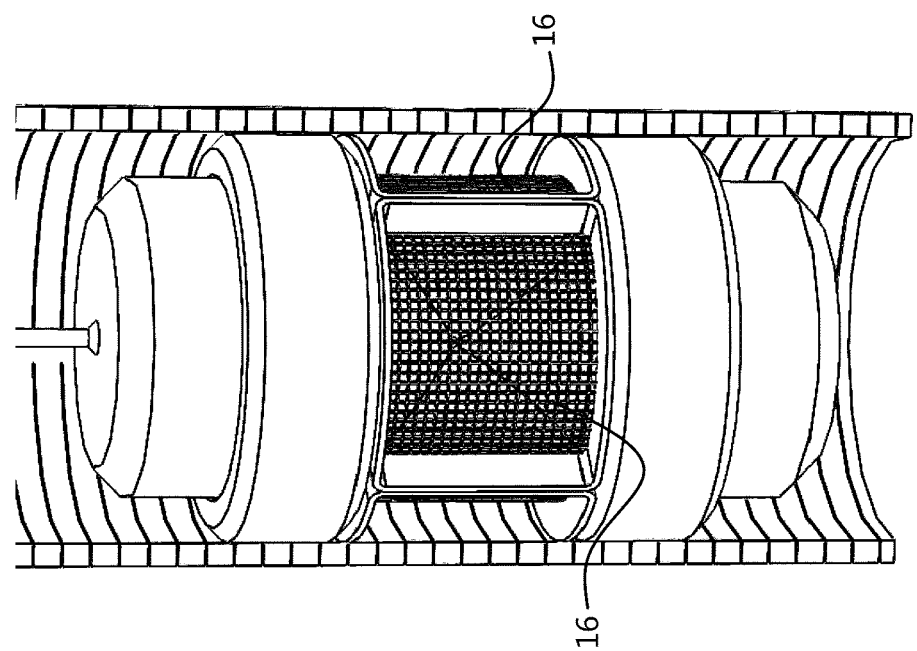
FIGS. 5A-B show specific embodiments of devices for monitoring fluid fluxes within monitoring tubes, according to an embodiment of the invention.
Figure 5A:
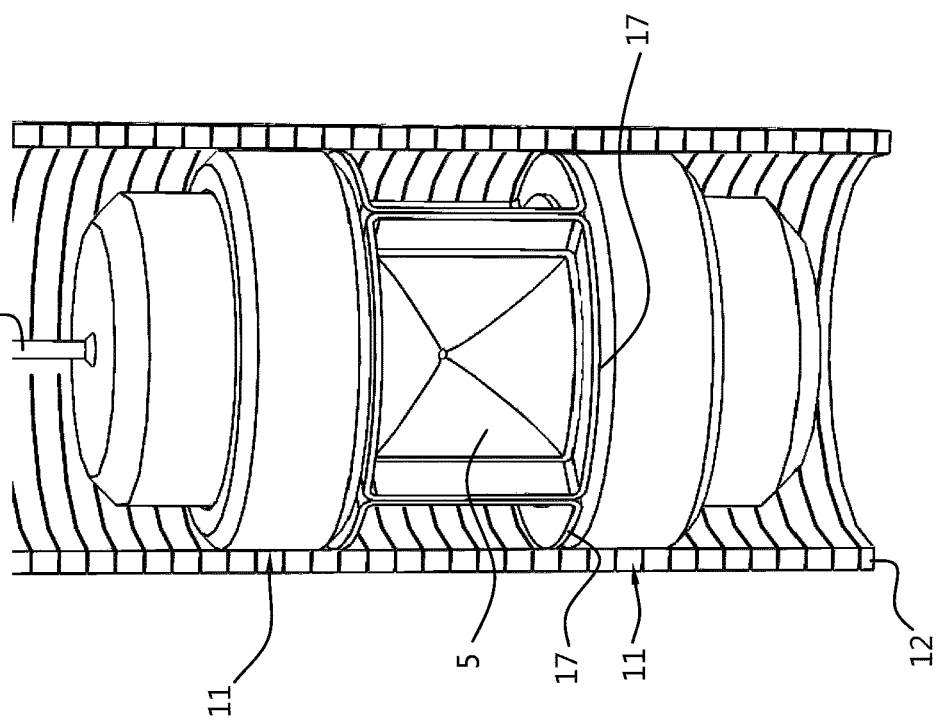

FIGS. 1A-C respectively show a perspective view and two side views of a device 1 according to a possible embodiment of the invention. The device 1 has an elongate, cylindrical body 2 providing four lateral openings 3. The device 1 is appropriate for being introduced into a medium carrying a fluid flow 4 (not shown in FIG. 1A-C), for instance into a soil carrying a horizontal groundwater flow. According to a non-limiting example, it may be possible to lower the body 2 within a monitoring tube 12, as shown in FIG. 5A-B. It may have lateral surfaces 11 that are suitable for slidably engaging and contacting an inner wall 12 of the monitoring tube. The body 2 may have a diameter of between 20 mm and 200 mm. The body may have a ratio of diameter and height of between 0.5 and 5.

FIGS. 2A-B further show longitudinal and lateral cuts of the device 1. Clearly, the openings 3 are arranged pairwise in opposition. All openings 3 have about the same shape and size, and they are at about the same longitudinal position 21. Each pair of opposite openings 3 is in mutual fluid communication. To such end, the body 2 provides two respective opening funnels 5 and a reduced channel portion 6 extending therebetween. The body 2 shown in FIG. 1-2 has two separate passages along which fluid can flow. Further depending on the fluid flow profile 4 in a neighborhood of the device 1, one opening 3 may act as a fluid inlet 3' while the opposite opening 3 will act as a fluid outlet 3". See FIG. 3B. The device 1 is preferably centrally symmetric in this regard, with respect to its central longitudinal axis.

The reduced channel portions 6 generally have a reduced cross-sectional area as compared to the corresponding openings 3. As such, there is an amplified fluid flux 8 (not shown in FIG. 1-2) within the reduced channel portions 6. The device 1 is further provided with flux sensing means 9 (not shown in FIG. 1-2), adapted for determining a flux level of fluid traveling within said reduced channel portions 6. Flux amplification may result in an increased precision and/or an expanded measuring range. Obtained sensor data allows for determining both a flow speed and a flow direction in relation to the aforementioned fluid flow 4. The latter is explained in detail below, based on FIG. 3A-B.

It is further noted that the opening funnels 5 are skewed and/or distorted. That is, the funnel entries (peripheral to the device 1) are not in line with the funnel exits (approximately central to the device 1). They are mutually offset 10". As such, also the reduced channel portions 6 are offset 10" with respect to each other, enabling them to cross each other along substantially orthogonal flow directions. Both reduced channel portions 6 are offset 10' with respect to the corresponding inlet and outlet openings 3, and therefore offset 10' with respect to the ensemble of all four inlet and outlet openings 3.

Figure 3B:
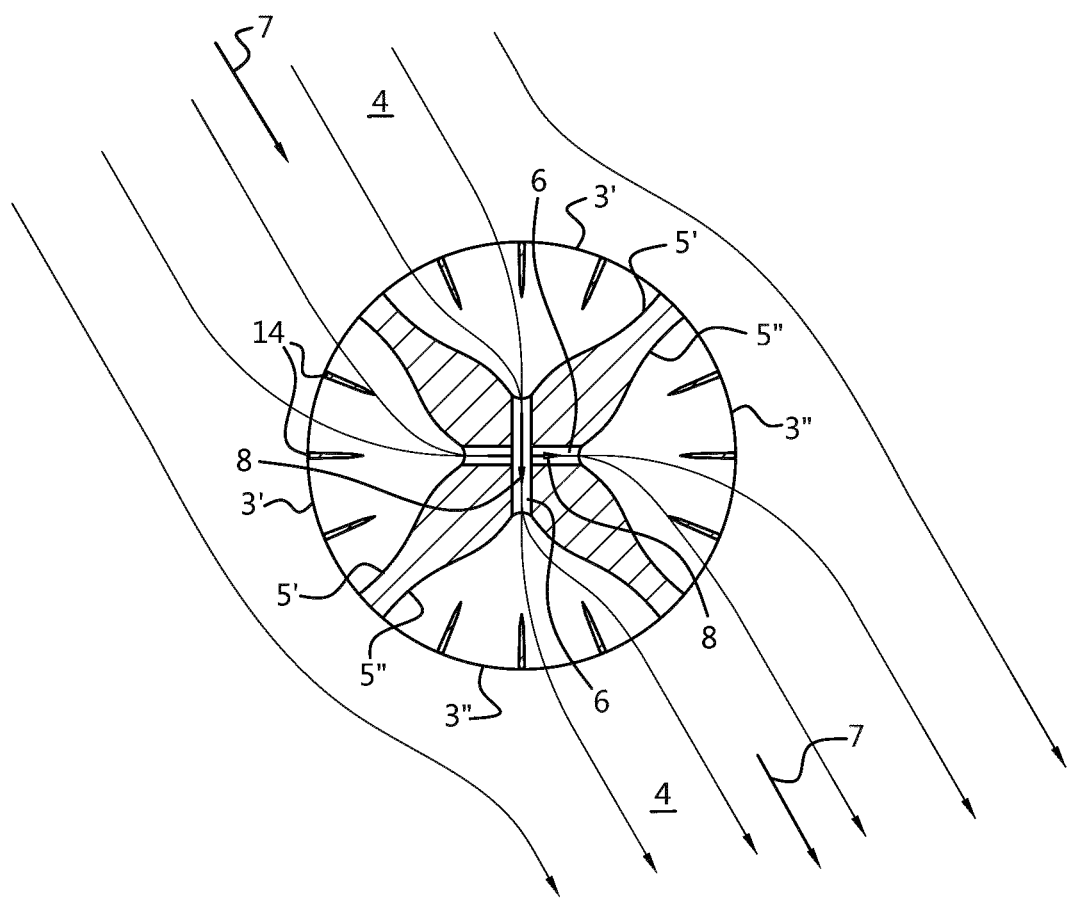

FIGS. 3A-B respectively give a perspective view and a lateral cross-section of a device 1 according to a further embodiment of the invention. The device 1 has a body 2 suitable for being introduced in a medium carrying a fluid flow 4, as depicted schematically in FIG. 3B. The body 2 has upper and lower circumferential surfaces 11 that may be suitable for slidingly engaging a groundwater monitoring well. Optionally, these surfaces may further include a circumferential groove 22 for receiving a circumferential sealing means. In an alternative use, the body 2 is introduced directly into the medium. For that purpose, a downward pin 13 may be provided.

The body 2 further has two pairs of mutually opposing openings 3 and respective opening funnels 5. The funnels 5 are arranged laterally. Opposite funnels 5 are in fluid communication by means of reduced channel portions 6 therebetween. Further, the openings 3 and opening funnels 5 are optionally provided with vertical blades 14 that resist bypass flow within each funnel 5. That is, fluid entering a funnel 5 is better guided towards the narrow funnel 5 exit, into the corresponding reduced channel portion 5.

The further design of the device 1 is similar to the embodiments of FIG. 1-2. In particular, the reduced channel portions 6 are offset 10" with respect to each other, enabling them to cross each other orthogonally at the center of the device 1. The funnel openings 3 are laterally arranged, along a circumference of the body 2. All four openings 3 have about the same size, and they are at the same longitudinal position 21. The funnels 5 themselves are distorted, so as to overcome the offset 10' between opposing funnel entries on the one hand, and respective funnel exits (and reduced channel portions 6) on the other hand.

As can be seen in FIG. 3B, the fluid flow 4 is perturbed in a neighborhood of the device 1. Portions of fluid flow 4 are separately collected by corresponding inlet funnels 5'. The inlet funnels 5' separately converge these "inlet fluxes" into respective "amplified fluxes" 8, within each reduced channel portion 6. Even moderate flux levels are recorded with high precision, because of amplification. Once having passed the reduced channel portion 6, fluid flux is returned as an "outlet flux" to the fluid flow 4, via a respective outlet funnel 5".

The general orientation of an inlet funnel 5' with respect to the fluid flow 4 will affect the amount of fluid flux 8 collected, and therefore also the flux level detected within the corresponding reduced channel portion 8. This principle will allow the user (or a control unit or a further analysis unit) to deduct a flow direction 7. Indeed, the device 1 of FIG. 3A-B allows for determining two orthogonal flux rates. Two respective orthogonal flow vector components are readily derived. The overall fluid flow 4, in terms of both flow direction and flow speed can be obtained via vector superposition. For determining de fluid flow direction 7 with respect to the medium, it will be important to also register the orientation of the device 1 with respect to said medium. The latter can for instance be done by means of a compass. Either an electronic compass or an analogue compass may do.

The translation of flux levels into values for the fluid flow direction and speed may go beyond simple vector superposition. In particular, any flux levels recorded may further be corrected for the design of the device 1. For example, the hydraulic conductivity of the funnels 5 and/or of the reduced channel portions 6 may be taken into account. The latter may be based on empirical, numerical, and/or theoretical considerations.

Most preferably however, the device only has a limited impact on the fluid flow 4. That is, the hydraulic resistivity of the funnels 5 and of the reduced channel portions 6 is preferably as low as possible. In this regard, as is the case throughout the embodiments of FIG. 1-9, any of the aforementioned offsets 10' is preferably overcome within the corresponding funnels 5, by means of a suitable "funnel distortion". As opposed to the reduced channel portions 6, the funnels 5 provide a lager cross-sectional area. Irregularities therefore have a lesser impact. However, the invention is not generally limited thereto. Alternatives are shown in FIG. 10A-B.

Figure 4A:
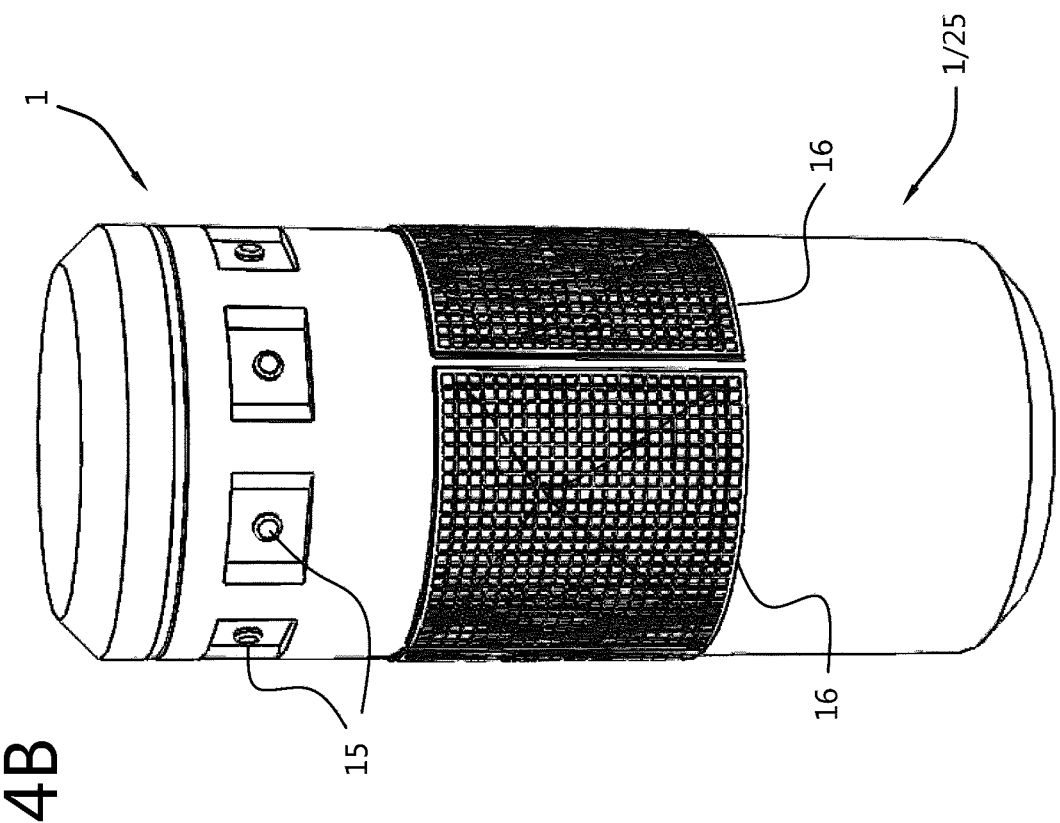
FIGS. 4A-B give a perspective view of a device according to an alternative embodiment of the invention.
Figure 4B:
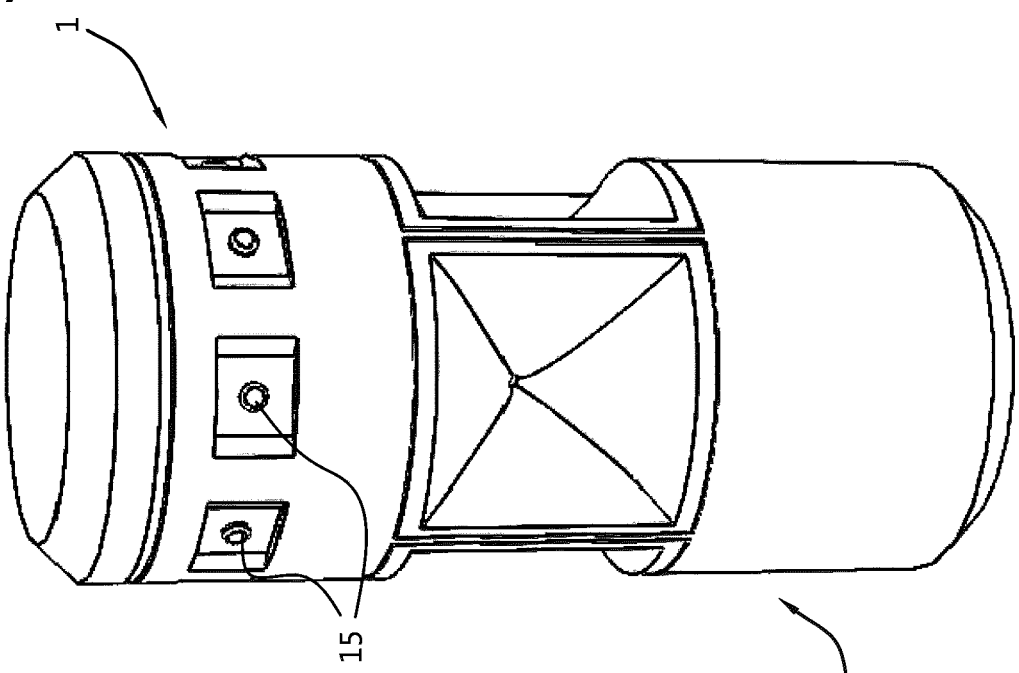

FIGS. 4A-B give a perspective view of a device 1 according to an alternative embodiment of the invention. In particular, the device 1 has additional sensors 15. The latter may be suitable for detecting substances dissolved in the fluid. Optionally, as shown in FIG. 4B, each funnel entry is further provided with a protective mesh 16 that is permeable to the fluid. Such protective meshes 16 prevent soiling and clogging.

FIGS. 5A-B show specific embodiments of devices for monitoring fluid flow 4 within monitoring tubes 12. In a non-limiting embodiment, the monitoring tube may be a vertical tube constituting a groundwater monitoring well.

In any case, the monitoring tube 12 has a perforated wall. Fluid is thus freely exchanged through said wall, between the device 1 and the surrounding medium. The device 1 further has upper and lower surfaces 11 for engaging an inner side of the tube 12. Sealing means 17 are additionally provided. A separate sealing rim is included for each of the funnels 5, circumscribing the latter. The sealing means 17 sealingly engage the inner side of the monitoring tube 12. As such, it is ensured that orthogonal flow vector components are effectively separated, within the monitoring tube 12. Finally, an upper portion of the device 1 is provided with a positioning and removal means 18. The latter may be a rod or a cable. The latter may further include, or may further be supplemented with a wired communication means 24 (see also FIG. 6B).

FIGS. 6A-B show further embodiments of the device 1, now provided with a cover member 19 for covering an access opening 20 of a monitoring tube 12. To such purpose, the cover member 19 has an insert portion and a cover portion. The cover member 19 may further include a housing that houses a control unit 23 of the device. A cable or rod 18 extends downwardly from the cover member 19 towards a measurement module 25 of the device 1. As can be seen in FIG. 6B, the device 1 may have one or more of such measurement modules 25 in superposition. A wired communication means 24 may further be included, allowing for communication between the control unit 23 and the measurement modules 25.

Figure 7A:
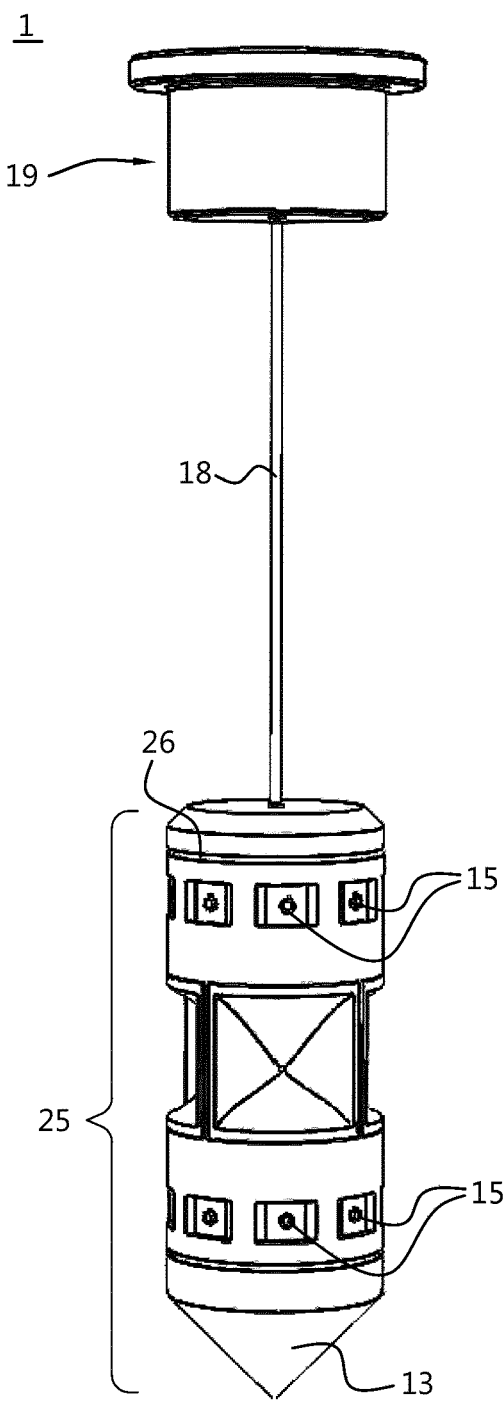
FIGS. 7-8 show still further embodiments of the device.
Figure 7B:
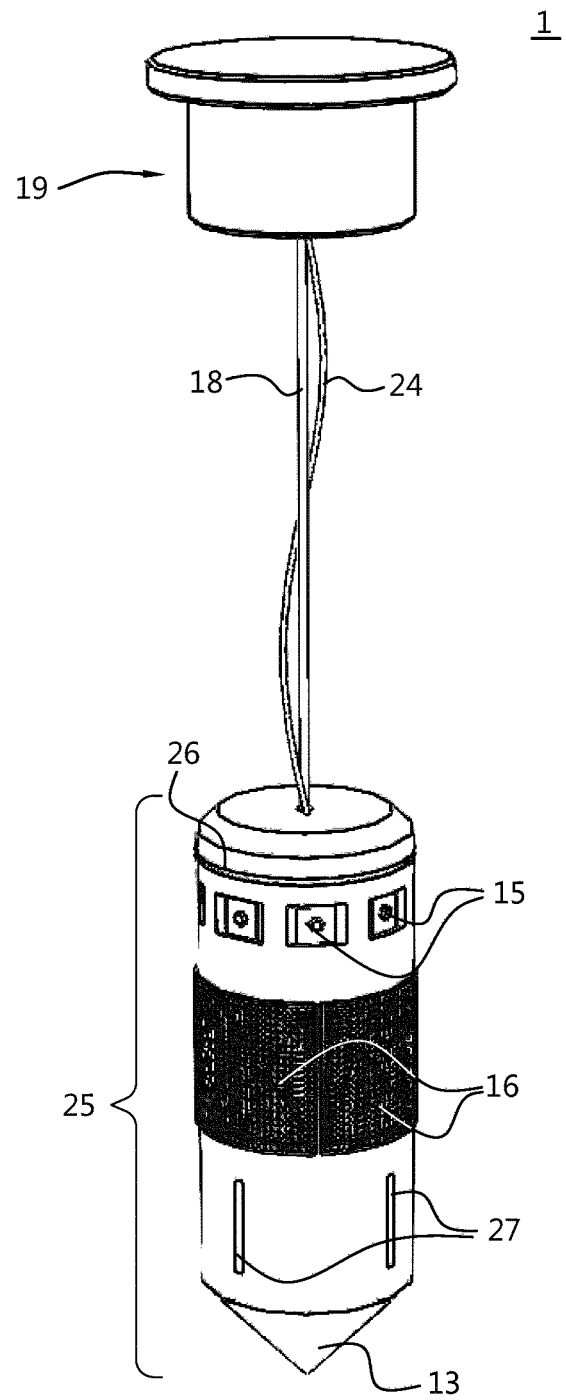
Figure 8:
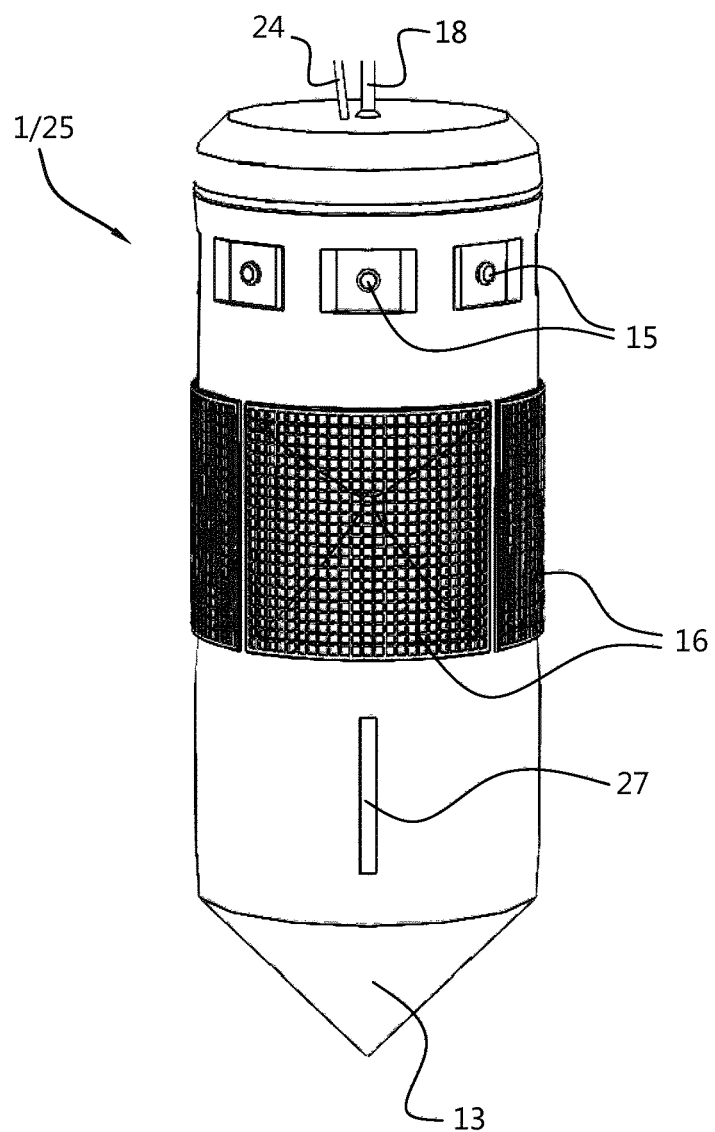

FIGS. 7-8 show still further embodiments of the device 1. A measurement module 25 of the device 1 may be provided with additional sensor means 15. The device body 2 may further provide circumferential flux sensor means 26 and/or vertical flux sensor means 27, so as to provide an improved characterization of the fluid flow 4.

Figure 9C:
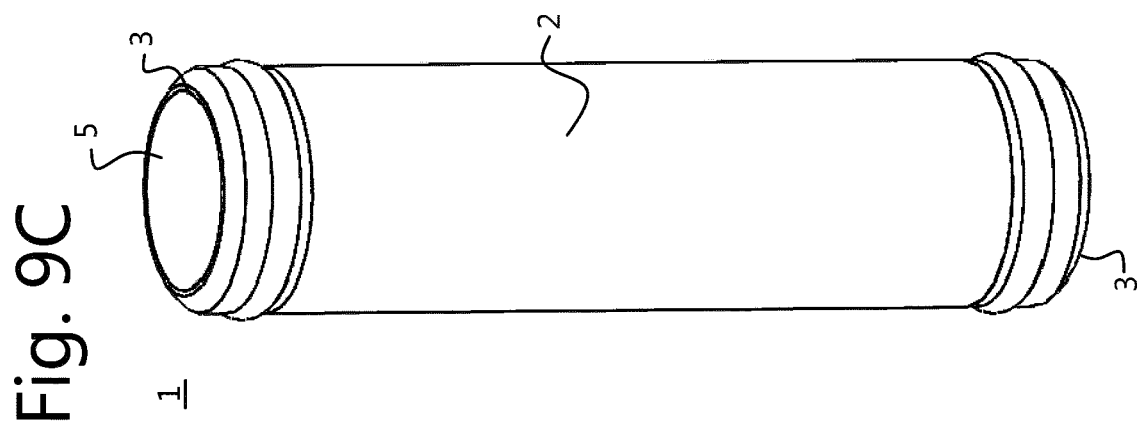
FIGS. 9A-C give two longitudinal cuts and a perspective view of a device according to an alternative embodiment of the invention.
Figure 9B:
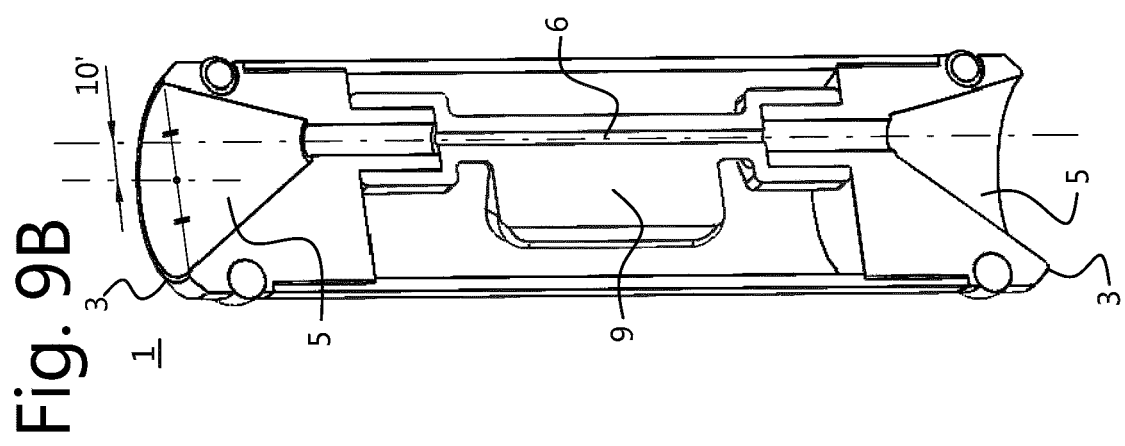
Figure 9A:
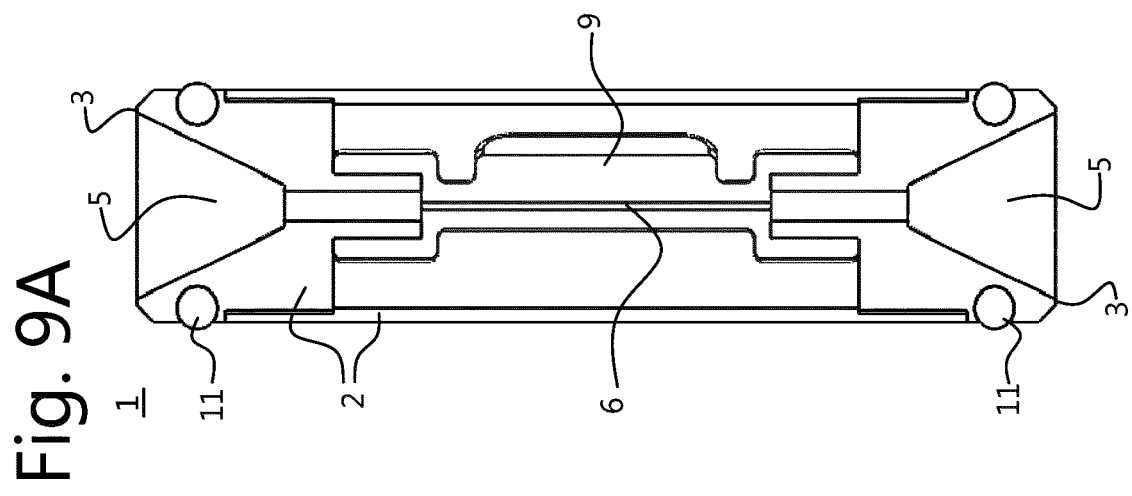
Figure 10A:
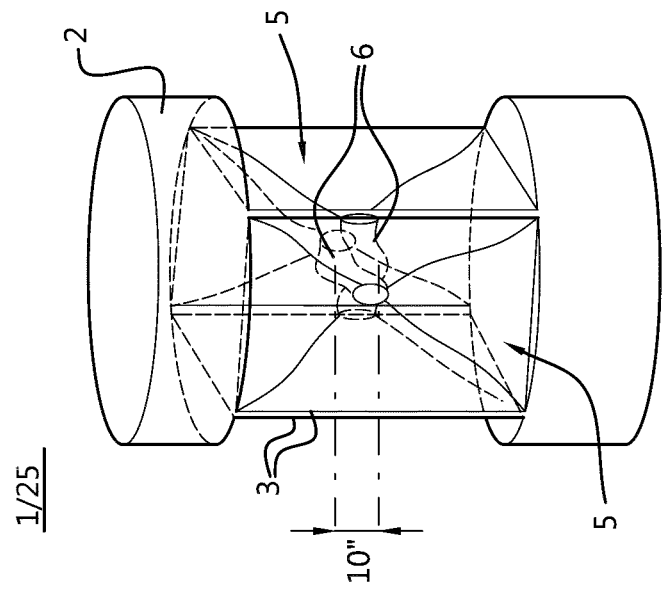
FIGS. 10A-B show yet alternative embodiments of the device.
Figure 10B:
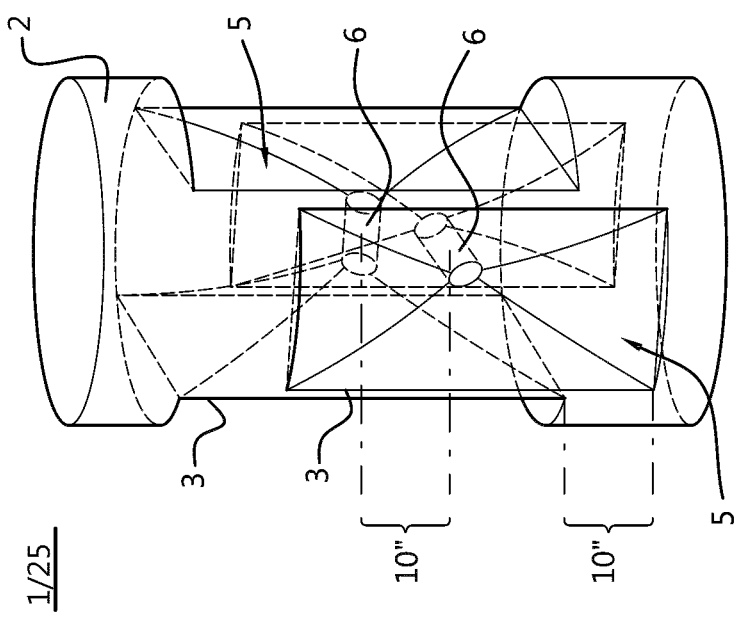

FIGS. 9A-C give two longitudinal cuts and a perspective view of a device 1 according to an alternative embodiment of the invention. Latter device 1 is especially adapted for registering longitudinal/vertical flow. To such end, the device 1 has an elongate body 2 that provides only one, longitudinal passage for the fluid. In particular, it has opposing inlet and outlet funnels 5 that provide corresponding inlet and outlet openings 3. The funnel exits connect to a reduced channel portion 6, within the body 2 of the device 1. The device 1 is further provided with means 9 for determining a flux level of fluid traveling within and along said reduced channel portion 6, through the body 2 of the device 1. For instance the device 1 can be provided within a monitoring tube (not shown) of a vertical monitoring well. Upper and lower washers 11 are especially adapted for sealingly engaging the inner tube wall. Vertical flow is registered.

In particular, as can be seen in FIG. 9B, the funnels 5 are distorted, having a funnel exit that is offset 10' with respect to the funnel inlet. As such, the reduced channel portion 6 is offset 10' with respect to the inlet and outlet openings 3 of the device 1. That is, the reduced channel portion 6 is not in line with, and central to latter openings 3. As an advantage, for a device body 2 of given size (for instance dictated by the monitoring tube), more space is available for the flux sensing means 9.

It will be apparent that a single device body can combine one or more lateral passages (as shown in FIGS. 1-8), and a longitudinal passage (as shown in FIG. 9). To such end, proper "offsets" are readily provided, such that the reduced channel portions can pass each other within the body. For fully characterizing a three-dimensional flow, at least three substantially orthogonal passages could be provided.

FIG. 10A shows yet an alternative embodiment of the device 1. It has a body 2 that provides two lateral passages for the fluid. Each passage has inlet and outlet openings 3, with corresponding inlet and outlet funnels 5 in fluid communication by means of a reduced channel portion 6. The passages are substantially orthogonal to one another. In the present embodiment, the funnels 5 do not have a distorted shape. In particular, their funnel exits are in line with their funnel entries. Also the reduced channel portion 6 of each passage is in line with its corresponding inlet and outlet openings 3. However, the passages as a whole (thus including the openings 3, the funnels 5, and the reduced channel portions 6) are offset 10" with respect to one another. A moderate offset 10" may already allow the reduced channel portions 6 to pass each other, while still providing flux level measurements that more or less correspond to the average longitudinal position.

FIG. 10B shows yet an alternative embodiment of the device 1. The inlet and outlet openings 3, as well as the inlet and outlet funnels 5 are provided at the same longitudinal position. However, at least one of the reduced channel portions 6 is now curved. As such, the reduced channel portions 6 have an offset 10" with respect to one another, and with respect to the ensemble of inlet and outlet openings 3, allowing them to pass each other.

It should be noted that the curvature of the reduced channel portions 6 may complicate measurements. Preferably, both reduced channel portions 6 are curved in a similar way, such that they have about the same hydraulic conductivity. Optionally, the obtained flow rate measurements are further corrected for this curved channel design.

Figures 11A, 11B, 11C:
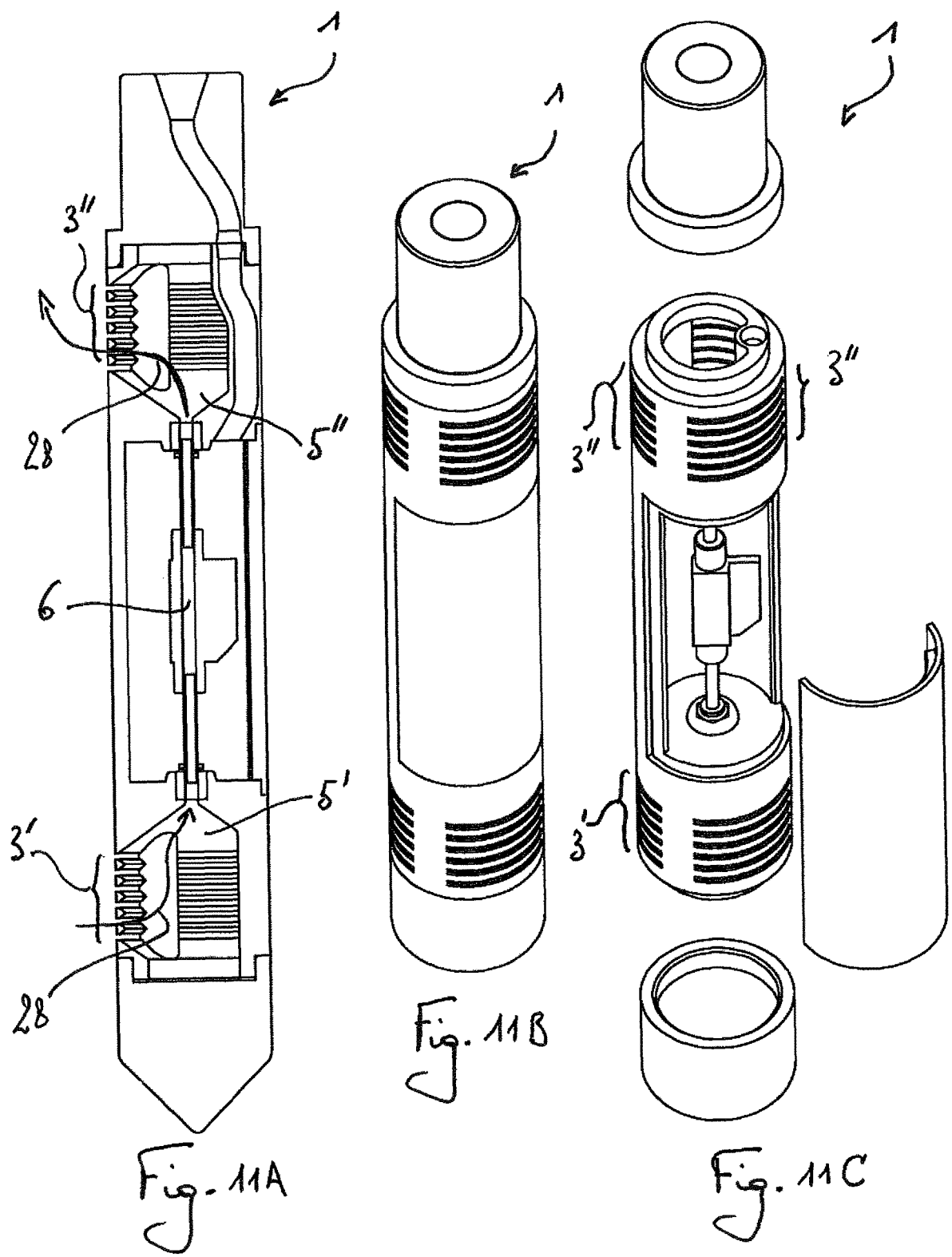
FIGS. 11A-C show a longitudinal cut, a perspective view, and an exploded view of a device according to another embodiment of the invention. The reduced channel portion is misaligned w.r.t. the inlets and outlets, in that it is orthogonal to its inlet and outlet opening zones.

FIGS. 11A-C show a longitudinal cut, a perspective view, and an exploded view of a device 1 according to another embodiment of the invention. The reduced channel portion 6 is misaligned w.r.t. the inlets 3' and outlets 3", in that it is orthogonal to its inlet and outlet opening zones 3', 3" (which are both arranged laterally). The reduced channel portion 6 is oriented longitudinally. Clearly, the inlet and outlet opening zones 3', 3" are not arranged in opposition, in the present case. As a consequence, the flux will necessarily comprise two curved courses 28 between being collected (laterally at inlet opening zone 3') and returned (laterally at the outlet opening zone 3"). The depicted device 1 may be suitable for monitoring vertical fluid flow (both upward and downward), e.g. when inserted within a monitoring well.

The numbered elements on the figures are:
1. Device
2. Body
3. (Inlet or outlet) opening
4. Fluid flow
5. (Inlet or outlet) funnel
6. Reduced channel portion
7. Flow direction
8. Amplified flux
9. Flux sensing means
10. Offset
11. Engaging means
12. Monitoring tube
13. Pin
14. Blade
15. Additional sensor means
16. Protective mesh
17. Sealing means
18. Positioning and removal means
19. Cover member
20. Access opening
21. Vertical level
22. Groove
23. Control unit
24. Wired communication means
25. Measurement module
26. Circumferential flow sensor
27. Vertical flow sensor
28. Curved course It is supposed that the present invention is not restricted to any form of realization described previously and that some modifications can be added to the presented example of fabrication without reappraisal of the appended claims.

The invention claimed is:

1. A device (1) for monitoring a fluid flow (4), said device (1) comprising a body (2) suitable for being introduced in a medium carrying a fluid flow (4), which body (2) provides at least two passages for the fluid, each having an inlet (3'), an outlet (3"), and a reduced channel portion (6) in fluid communication with said inlet (3') and outlet (3") via respective inlet and outlet funnels (5', 5"), said device (1) further comprising means (9) for determining a flux level of fluid traveling within one or more of said reduced channel portions (6), characterized in that at least one of said reduced channel portions (6) is misaligned with respect to said inlets (3') and outlets (3"), wherein said reduced channel portion (6) is offset (10') with respect to said inlets (3') and outlets (3"), and wherein said at least two such passages are in substantially different directions.

2. The device (1) of claim 1, wherein said reduced channel portion (6) is offset (10') with respect to its corresponding inlet (3') and outlet (3").

3. The device (1) of claim 1, wherein said funnels (5) each have a funnel entry, and wherein at least one funnel (5) has a funnel exit that is offset (10') with respect to its funnel entry.

4. The device (1) of claim 1, wherein said passages are mutually orthogonal.

5. The device (1) of claim 1, wherein reduced channel portions (6) of said passages are offset (10") with respect to one another.

6. The device (1) of claim 1, wherein said body (2) has an elongate shape, and wherein at least one inlet (3') and corresponding outlet (3") are arranged laterally.

7. The device (1) of claim 6, wherein said inlet (3') and outlet (3") are arranged in opposition.

8. The device (1) of claim 7, wherein said body (2) has a substantially cylindrical shape.

9. The device (1) of claim 6, wherein said body (2) has an upper and/or a lower means (11) for slidingly engaging a monitoring tube (12).

10. The device (1) of claim 1, further provided with a cover member (19) for covering an access opening (20) of a monitoring tube (12), which cover member (19) houses a control unit of the device (1).

11. A method for monitoring a fluid flow (4), comprising the steps of:
    collecting, at an inlet (3'), at least two inlet fluxes from a medium carrying a fluid flow (4), wherein said at least two inlet fluxes are collected from substantially different flux directions,
    converging said inlet fluxes into an amplified flux (8), wherein said amplified flux (8) is offset (10') with respect to the inlet fluxes collected, and/or with respect to an outlet flux returned,
    determining a flux level in relation to said amplified flux (8),
    diverging said amplified flux (8), and
    returning, at an outlet (3"), said diverged flux to said medium as an said outlet flux,
characterized in that a flux comprises a curved course between being collected and returned, wherein said inlet fluxes and said outlet flux have substantially the same flow velocity, and wherein a fluid flow direction is determined, based on flux levels determined in relation to said at least two inlet fluxes.

12. The method of claim 11, wherein said method is applied for monitoring a groundwater flow.

* * * * *